(12) United States Patent
Thompson et al.

(10) Patent No.: US 9,797,482 B2
(45) Date of Patent: Oct. 24, 2017

(54) BELT TENSIONER MOUNT

(71) Applicant: Schaeffler Technologies AG & Co. KG, Herzogenaurach (DE)

(72) Inventors: Scott Thompson, Warren, MI (US); Andrew Kaye, West Bloomfield, MI (US); Jesse Myers, Waterford, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 129 days.

(21) Appl. No.: 14/990,390

(22) Filed: Jan. 7, 2016

(65) Prior Publication Data

US 2016/0215860 A1 Jul. 28, 2016

Related U.S. Application Data

(60) Provisional application No. 62/106,516, filed on Jan. 22, 2015, provisional application No. 62/118,277, filed on Feb. 19, 2015.

(51) Int. Cl.
*F16H 7/12* (2006.01)
*F16H 7/08* (2006.01)

(52) U.S. Cl.
CPC ......... *F16H 7/1281* (2013.01); *F16H 7/1236* (2013.01); *F16H 2007/0806* (2013.01); *F16H 2007/0812* (2013.01); *F16H 2007/0842* (2013.01); *F16H 2007/0859* (2013.01); *F16H 2007/0893* (2013.01)

(58) Field of Classification Search
CPC .... F16H 7/1281; F16H 7/1236; F16H 7/1218; F16H 7/0831; F16H 2007/0806; F16H 2007/0812; F16H 2007/0825; F16H 2007/0842; F16H 2007/0859; F16H 2007/0874; F16H 2007/0893
See application file for complete search history.

(56) References Cited

U.S. PATENT DOCUMENTS

| | | | |
|---|---|---|---|
| 5,752,891 A * | 5/1998 | Meckstroth | F02B 67/06 474/110 |
| 6,991,570 B2 | 1/2006 | Serkh | |
| 7,597,639 B2 | 10/2009 | Serkh | |
| 8,568,259 B2 | 10/2013 | Robbins et al. | |
| 2014/0309882 A1* | 10/2014 | Antchak | F02B 67/06 701/36 |

* cited by examiner

*Primary Examiner* — William E Dondero
*Assistant Examiner* — Robert T Reese
(74) *Attorney, Agent, or Firm* — Adam R. Southworth

(57) ABSTRACT

A belt tensioner for an accessory drive of an internal combustion engine having a lever arm rotatably assembled to a hydraulic strut assembly. The hydraulic strut assembly including a fixing eye for rotatably mounting to a mounting boss of an engine, the fixing eye having a cupped portion at a first end to seat onto the mounting boss and a travel limiter at a second end extending along an axis of the hydraulic strut to limit travel of the lever arm toward the fixing eye.

8 Claims, 12 Drawing Sheets

US 9,797,482 B2

BELT TENSIONER MOUNT

TECHNICAL FIELD

The present disclosure relates to a hydraulic tensioner for an accessory drive of an internal combustion engine, and in particular the mount for a hydraulic tensioner for a belt drive.

BACKGROUND

FIG. 13 is a cross sectional view of a prior art hydraulic strut 200 with longitudinal axis LA and lever arm 201 connected with a fastener 203 at lever arm eye 202. Hydraulic strut 200 includes central hydraulic cylinder 206 surrounded by compression coil spring 207. Strut 200 is connected by fastener 215 at a lower eye 208 to a mounting boss or fixed support 211 that is fixedly connected to internal combustion engine 212. As arm 201 sweeps through a motion to move an associated pulley (not shown) of a continuous belt arrangement tensioning the belt as is known in the art, force F is applied to strut 200, compressing strut 200, in turn exerting shear loads S on fastener 215. These shear loads may lead to failure of fastener 215.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
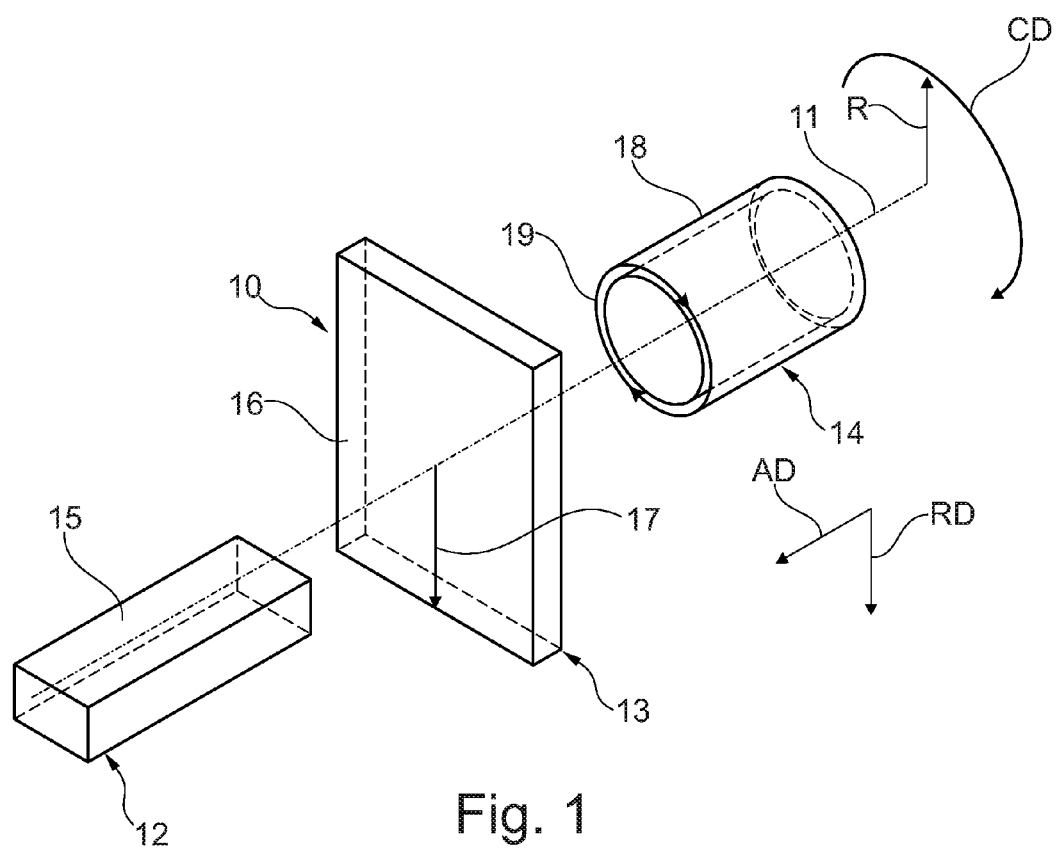
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD. FIG. 1 is a perspective view of asymmetrical bearing cage 100 with orientation feature 102.

Figure 2:
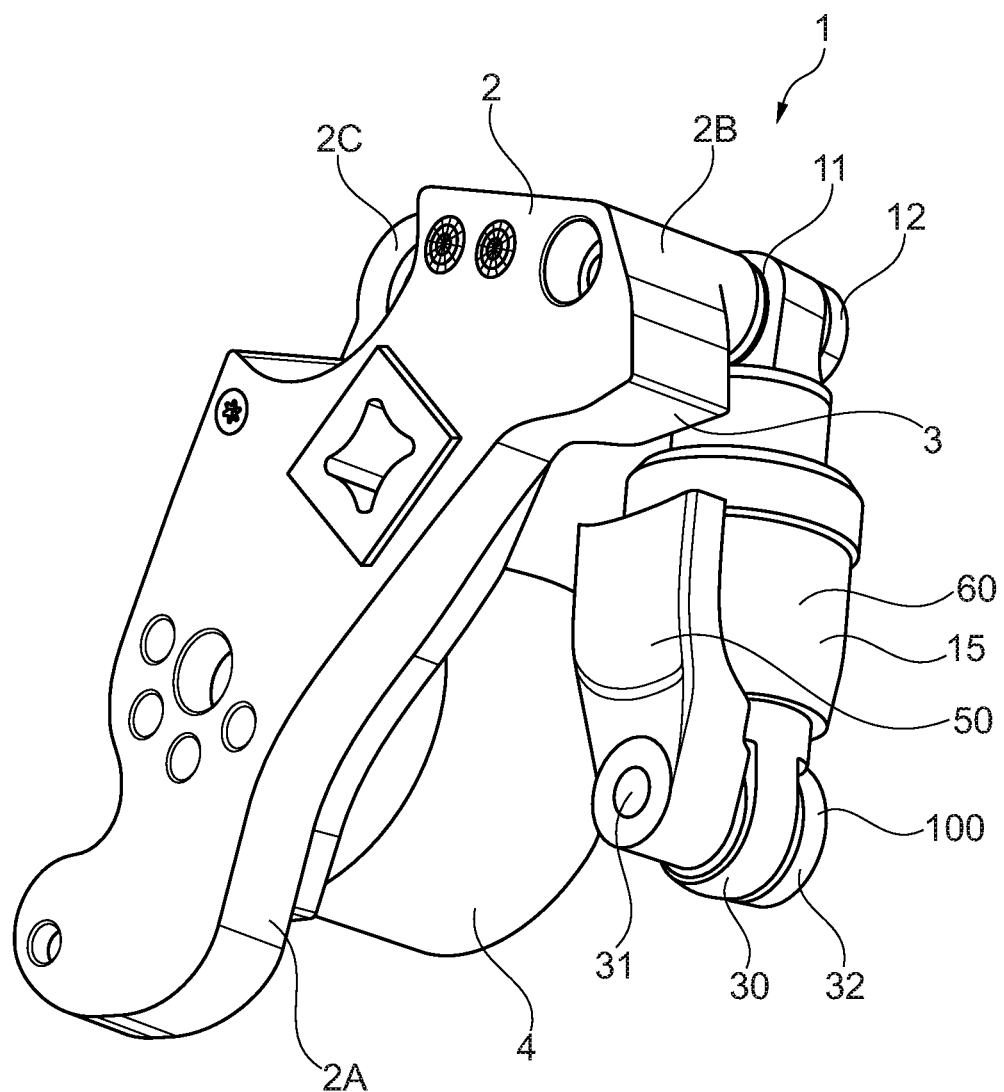
FIG. 2 is a front perspective view of a belt tensioner assembly according to one example embodiment.
Figure 3:
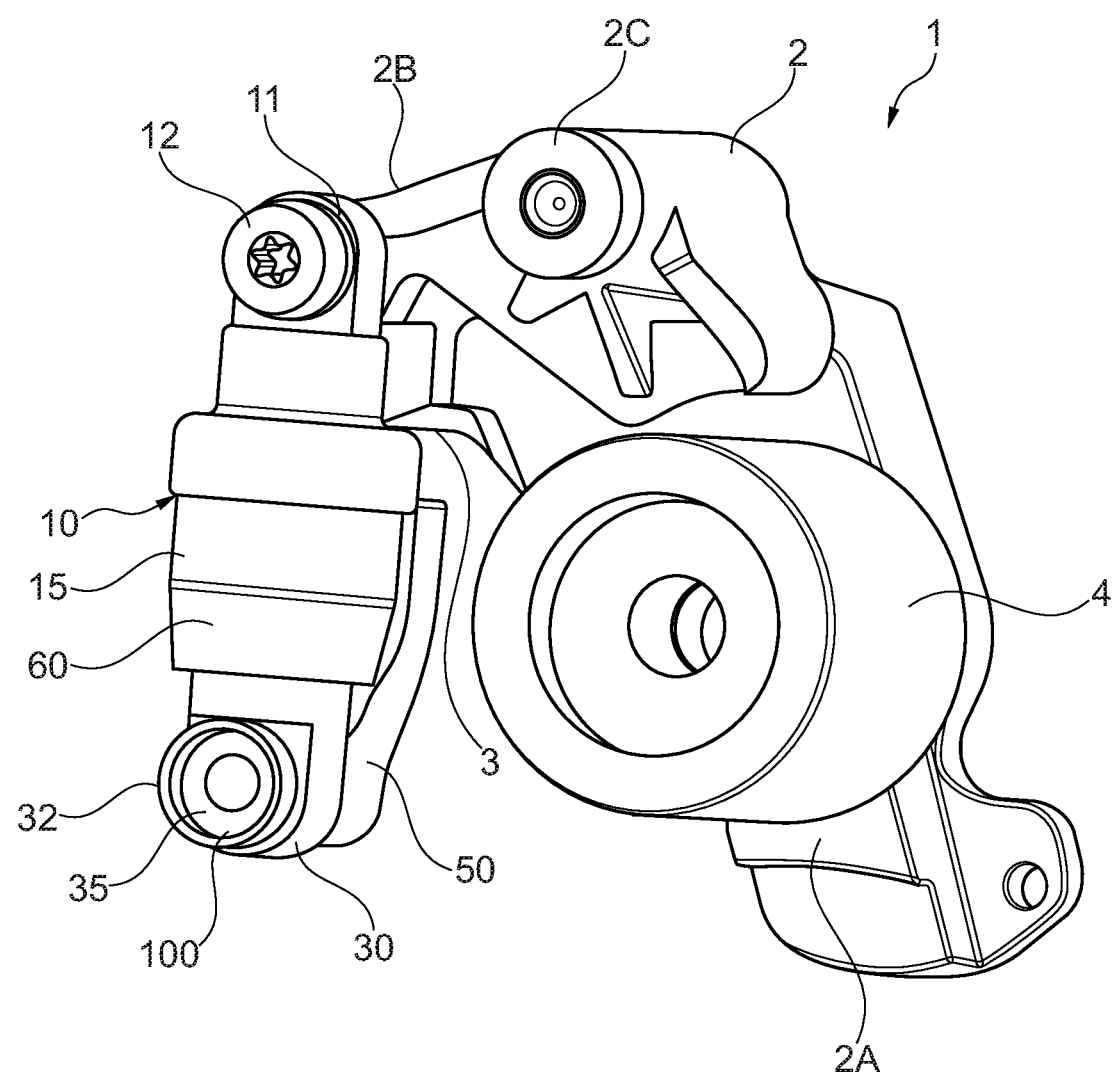
FIG. 3 is a rear perspective view of the belt tensioner assembly of FIG. 2.
Figure 4:
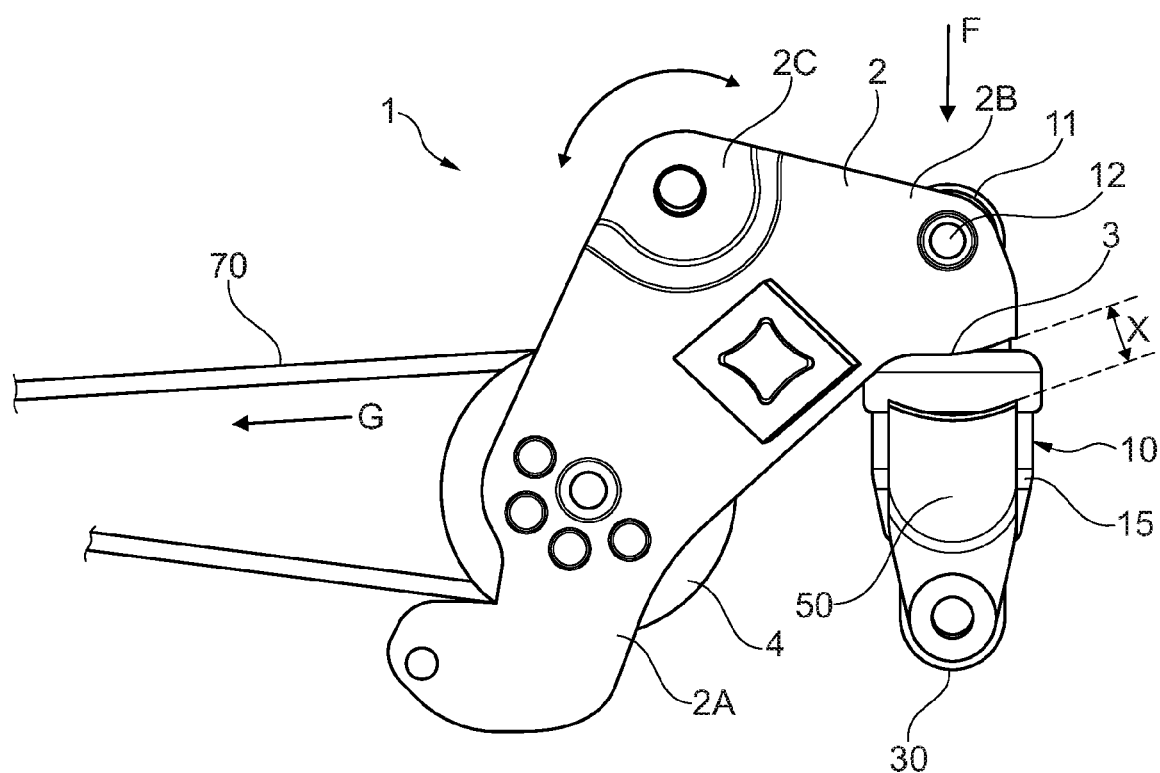
FIG. 4 is a front view of the belt tensioner assembly of FIG. 2, with a pulley and belt arrangement with arm in non-tensioning phase.
Figure 5:
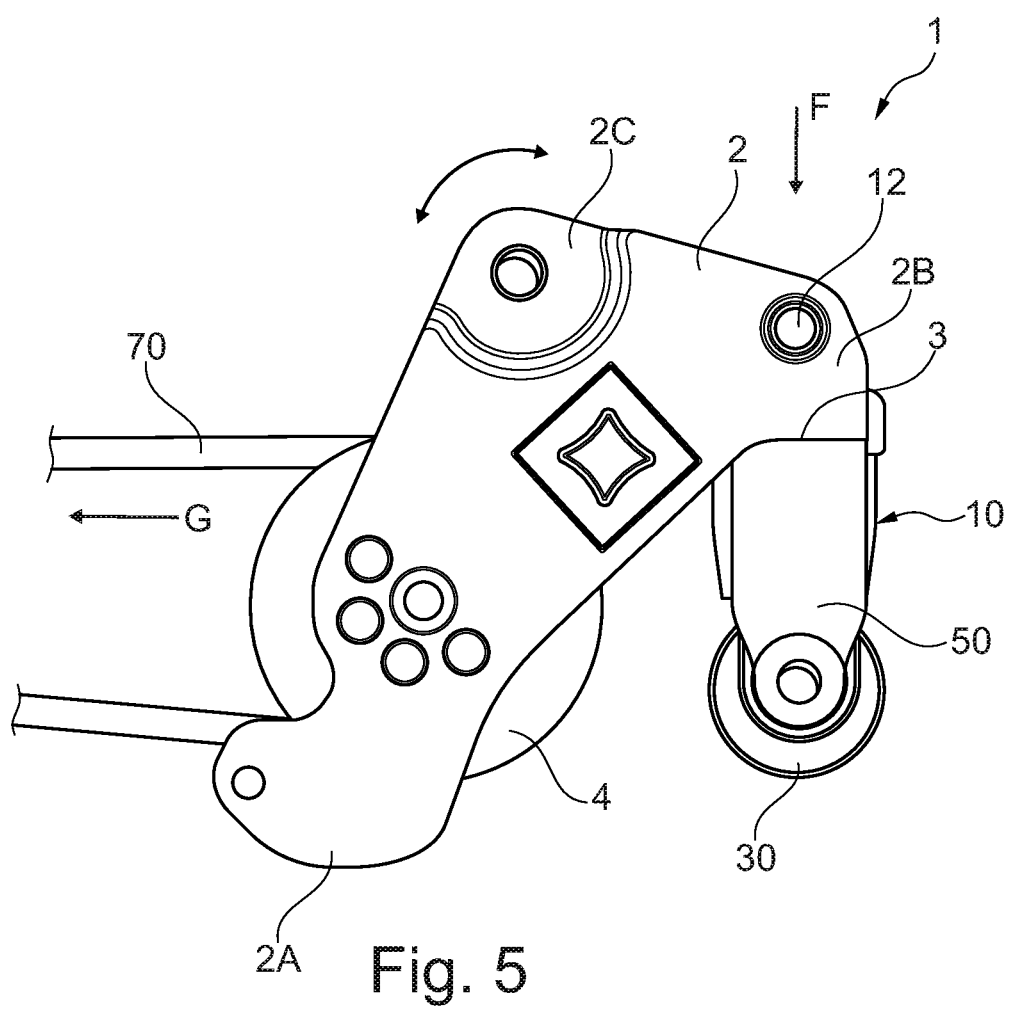
FIG. 5 is a front view of the belt tensioner assembly of FIG. 2, with a pulley and belt arrangement with the lever arm in tensioning phase.
Figure 6:
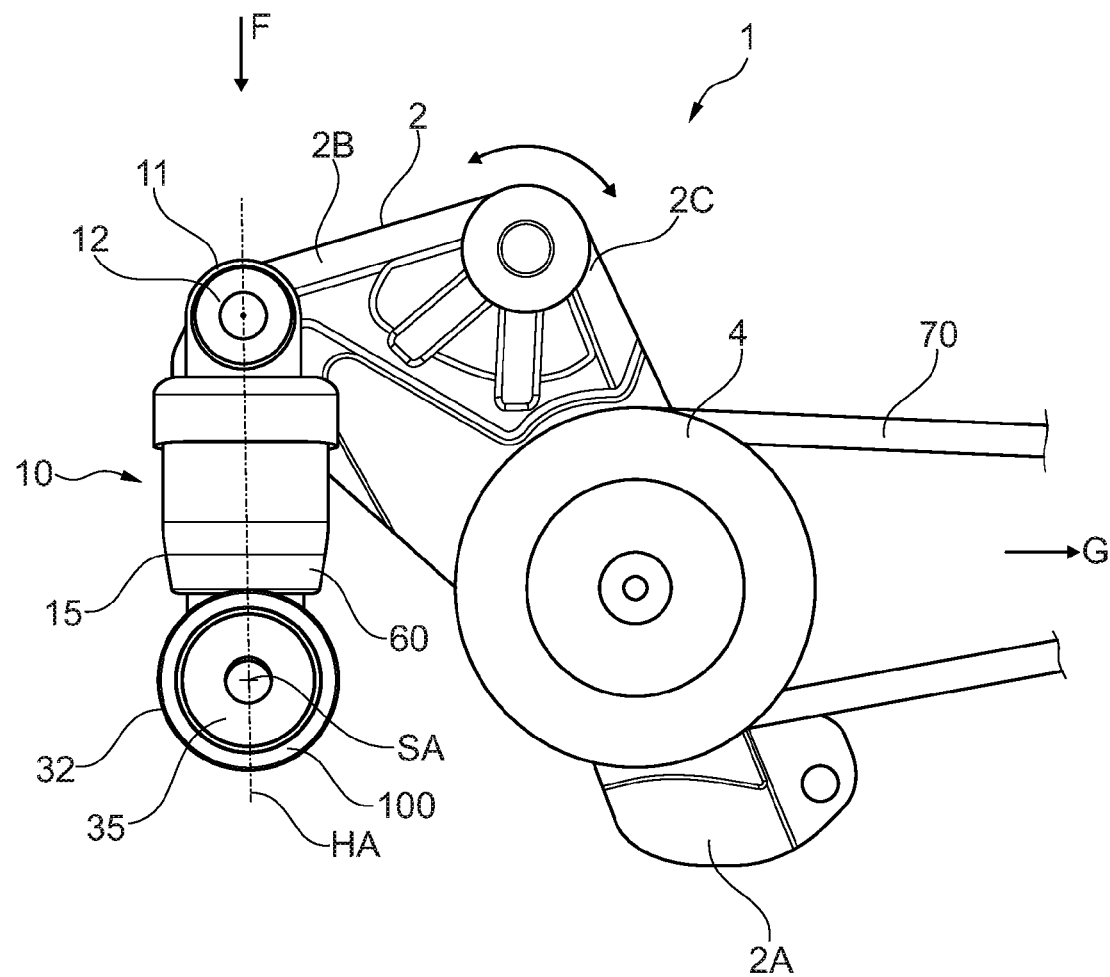
FIG. 6 is a rear view of FIG. 5.
Figure 7:
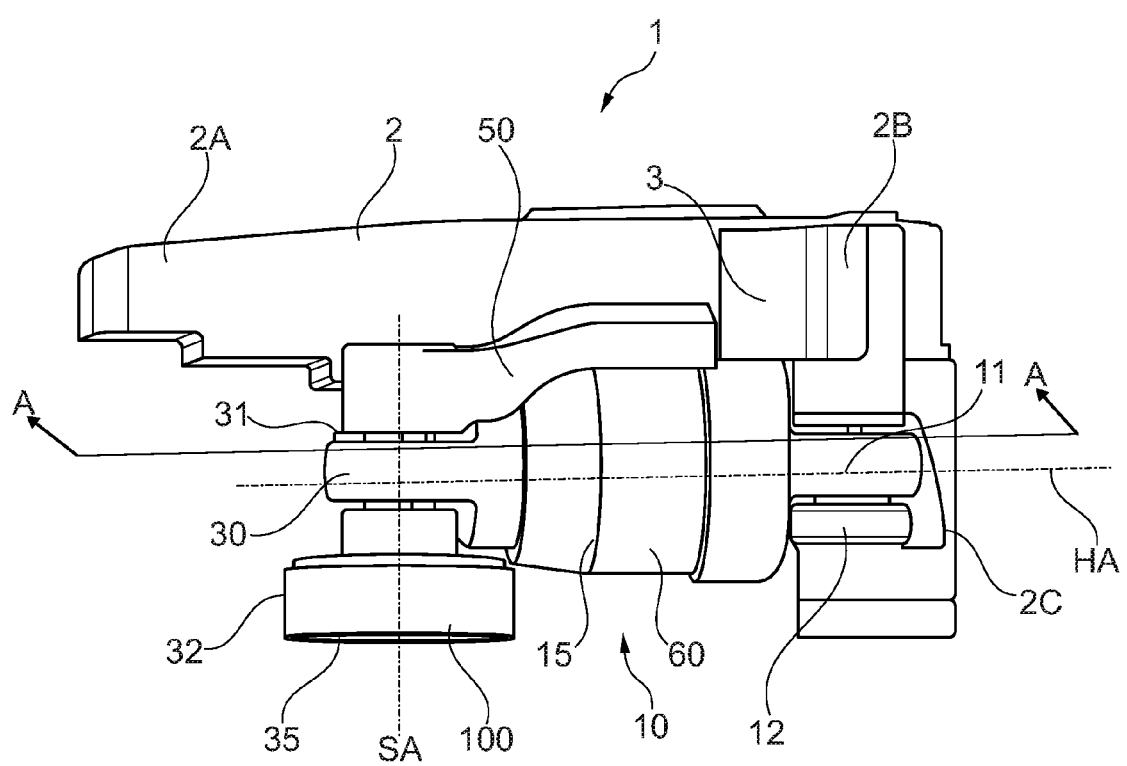
FIG. 7 is a side view of the belt tensioner assembly of FIG. 2.
Figure 8:
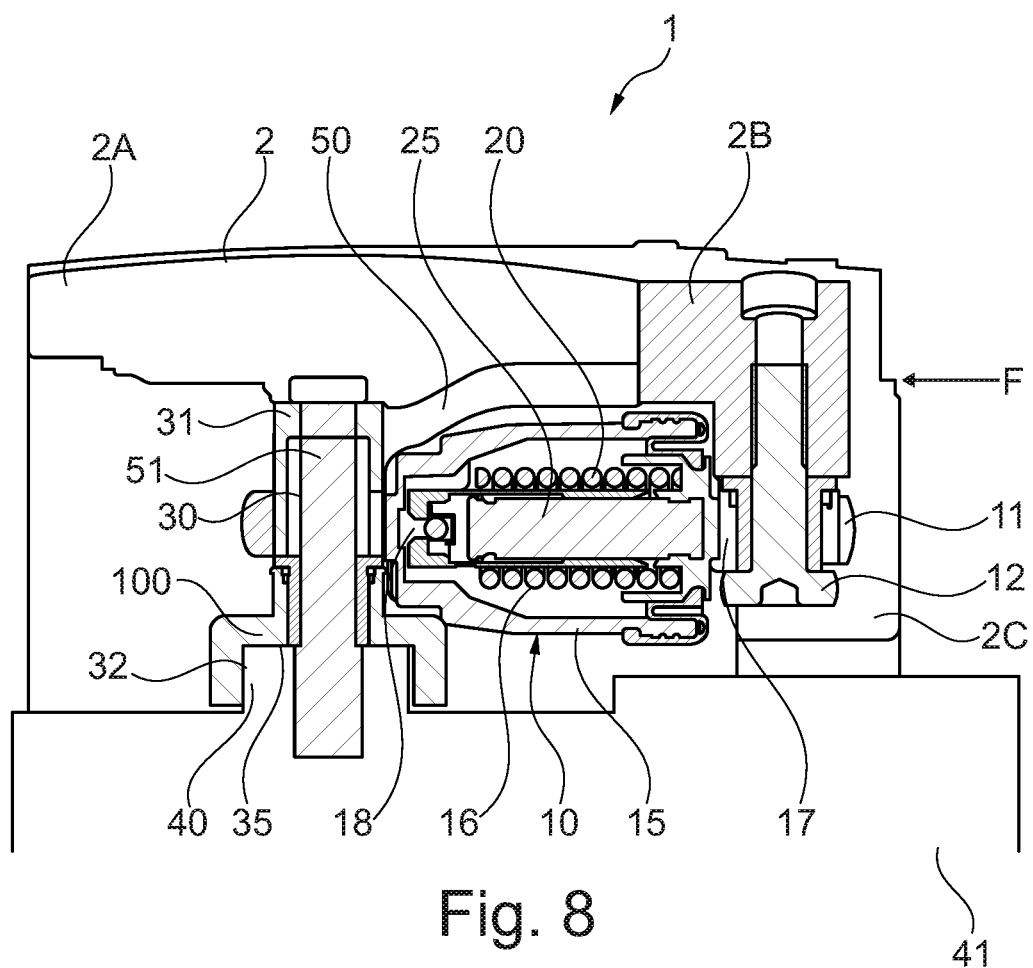
FIG. 8 is a cross-sectional view of the belt tensioner assembly of FIG. 7, taken along line A-A.
Figure 9:
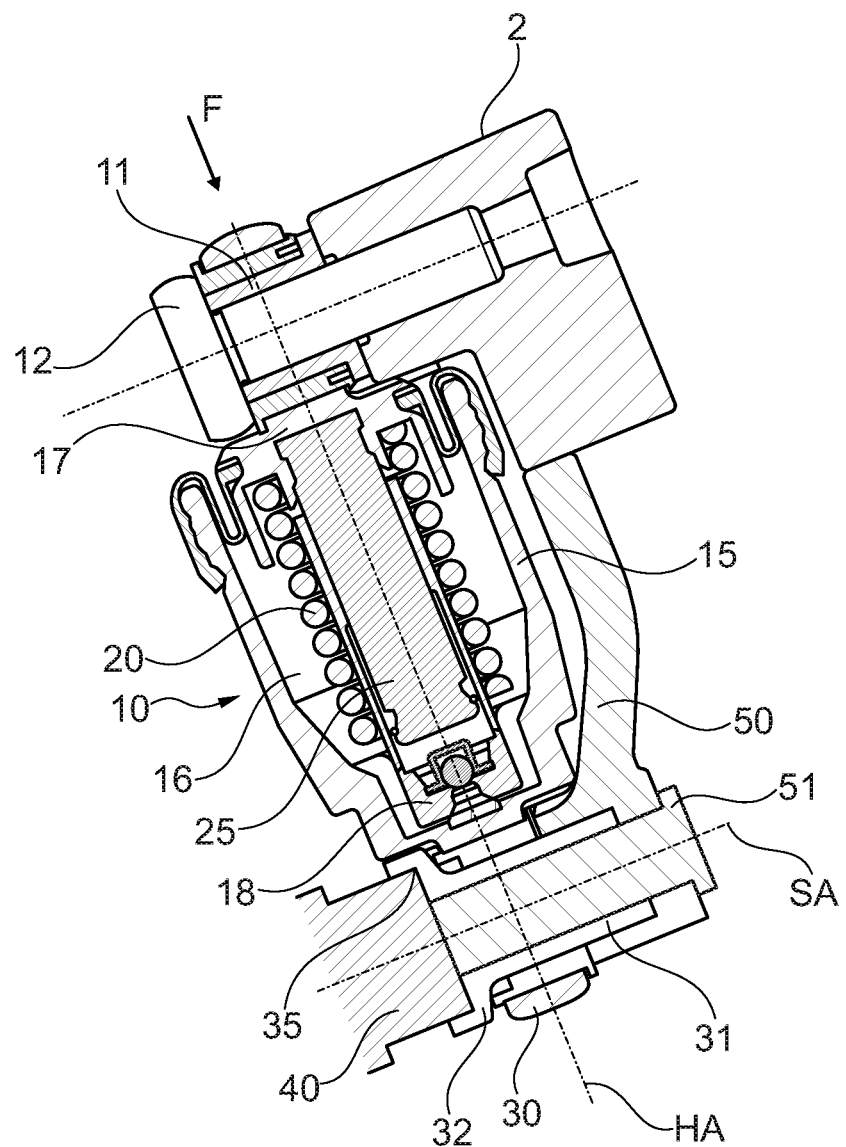
FIG. 9 is a cross-sectional view of the hydraulic strut sub-assembly of the belt tensioner assembly of FIG. 8.

FIG. 2 is a front perspective view of belt tensioner assembly 1 according to one example embodiment. FIG. 3 is a rear perspective view of the belt tensioner assembly of FIG. 2. FIG. 4 is a front view of the belt tensioner assembly of FIG. 2, with a pulley and belt arrangement with arm in non-tensioning phase. FIG. 5 is a front view of the belt tensioner assembly of FIG. 2, with a pulley and belt arrangement with the lever arm in tensioning phase. FIG. 6 is a rear view of FIG. 5. FIG. 7 is a side view of the belt tensioner assembly of FIG. 2. FIG. 8 is a cross-sectional view of the belt tensioner assembly of FIG. 7, taken along line A-A. FIG. 9 is a cross-sectional view of the hydraulic strut sub-assembly of the belt tensioner assembly of FIG. 8. The following description should be viewed in light of FIGS. 1-9. Belt tensioner 1 includes; lever arm 2 having a pulley end 2A, strut end 2B, travel stop 3 and a pivot point 2C between pulley end 2A and strut end 2B; pulley 4 rotatably mounted to lever arm 2 at pulley end 2A; and hydraulic strut sub-assembly 10 rotatably mounted to lever arm 2 at strut end 2B. Strut sub-assembly 10 includes; first fixing eye 11 rotatably assembled to lever arm 2 at strut end 2B, for example, using fastener 12; outer housing 15 having an inner hydraulic cavity 16, top portion 17 and bottom portion 18; coil spring 20 within cavity 16, extending from top portion 17 to bottom portion 18 of housing 15; hydraulic piston 25 nested within coil spring 20 for hydraulically damping lever arm 2; second fixing eye 30 rotatably mounted on mounting collar 100; mounting collar 100 having first longitudinal end 31 extending toward lever arm 2 and second longitudinal end 32 including cupped portion 35 arranged to seat on mounting boss 40 of engine 41; bar or travel limiter 50 is mounted on first longitudinal end 31 of mounting collar 100, and extending axially with respect to axis HA of hydraulic strut 60 towards stop 3 of lever arm 2, for limiting travel of arm 2 relative to second fixing eye 30; travel limiter 50, mounting collar 100 and second fixing eye 30 mounted to engine 41 with fastener 51 extending through the assembly.

Lever arm 2 pivots about pivot point 2C, as indicated by arrows in FIGS. 4-6. In FIG. 4, lever arm 2 is in un-tensioned phase or position, wherein no or limited force G is being exerted by belt 70 against pulley 4, creating gap X between lever arm stop 3 and travel limiter or bar 50. In this phase limited force F is being exerted against second fixing eye 30 and fastener 51. However, when in full tensioned phase, as shown in FIGS. 5 and 6, lever arm stop 3 contacts bar or travel limiter 50, transferring load through travel limiter 50, through mounting collar 100, into cupped portion 35 and to boss 40. In prior art belt tensioners, force F would transfer as a shear load to fastener 51. In this embodiment, load is transferred in a different way limiting transfer to fastener 51.

Figure 10:
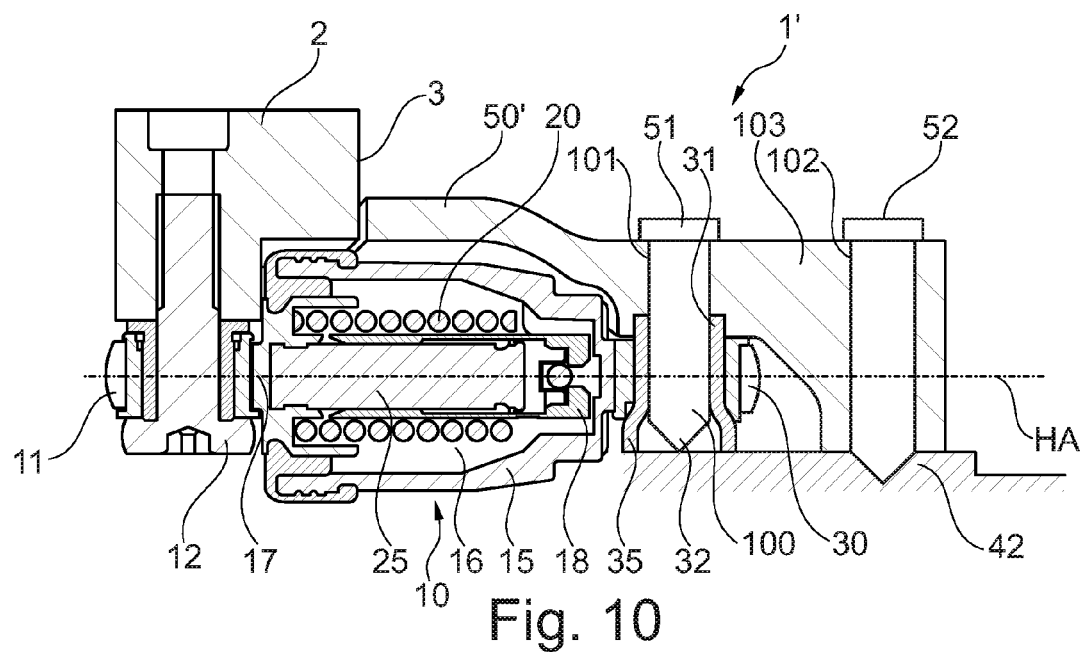
FIG. 10 is a cross-sectional view of a belt tensioner assembly according to a second example embodiment.
Figure 11:
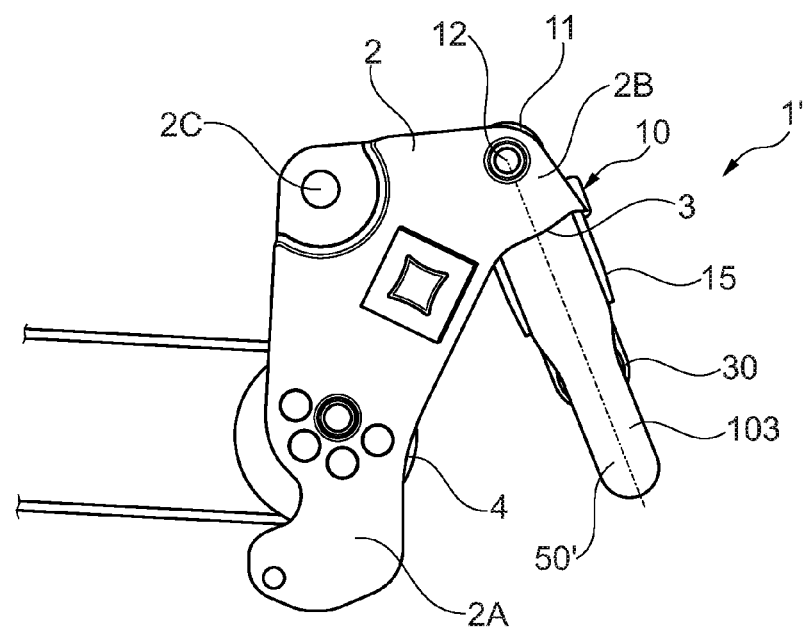
FIG. 11 is a front view of the belt tensioner assembly of FIG. 10, with a pulley and belt arrangement.
Figure 12:
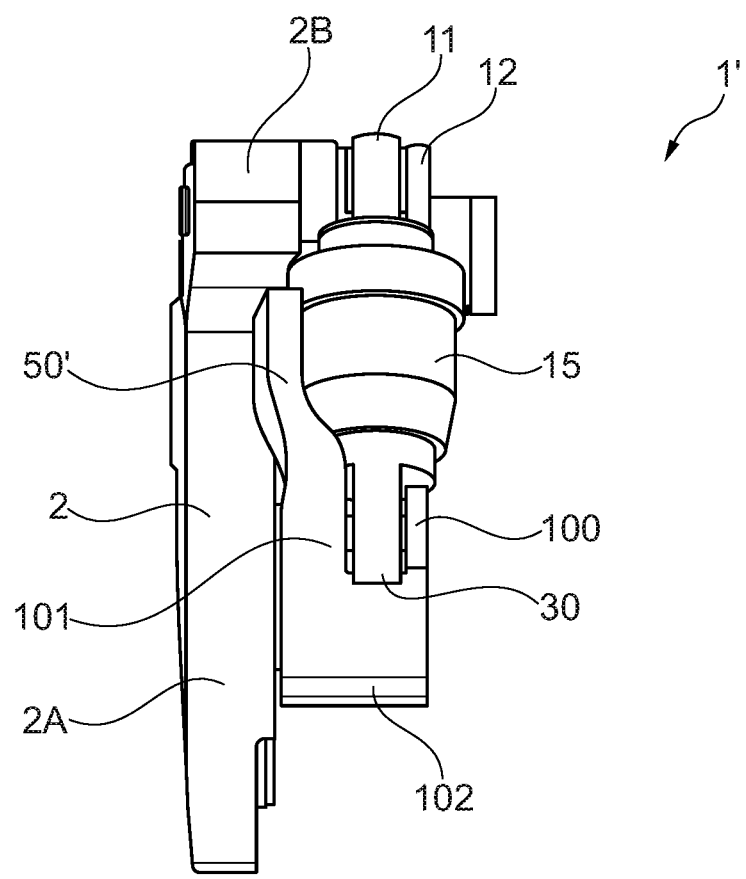
FIG. 12 is a side view of the belt tensioner assembly of FIG. 10.
Figure 13:
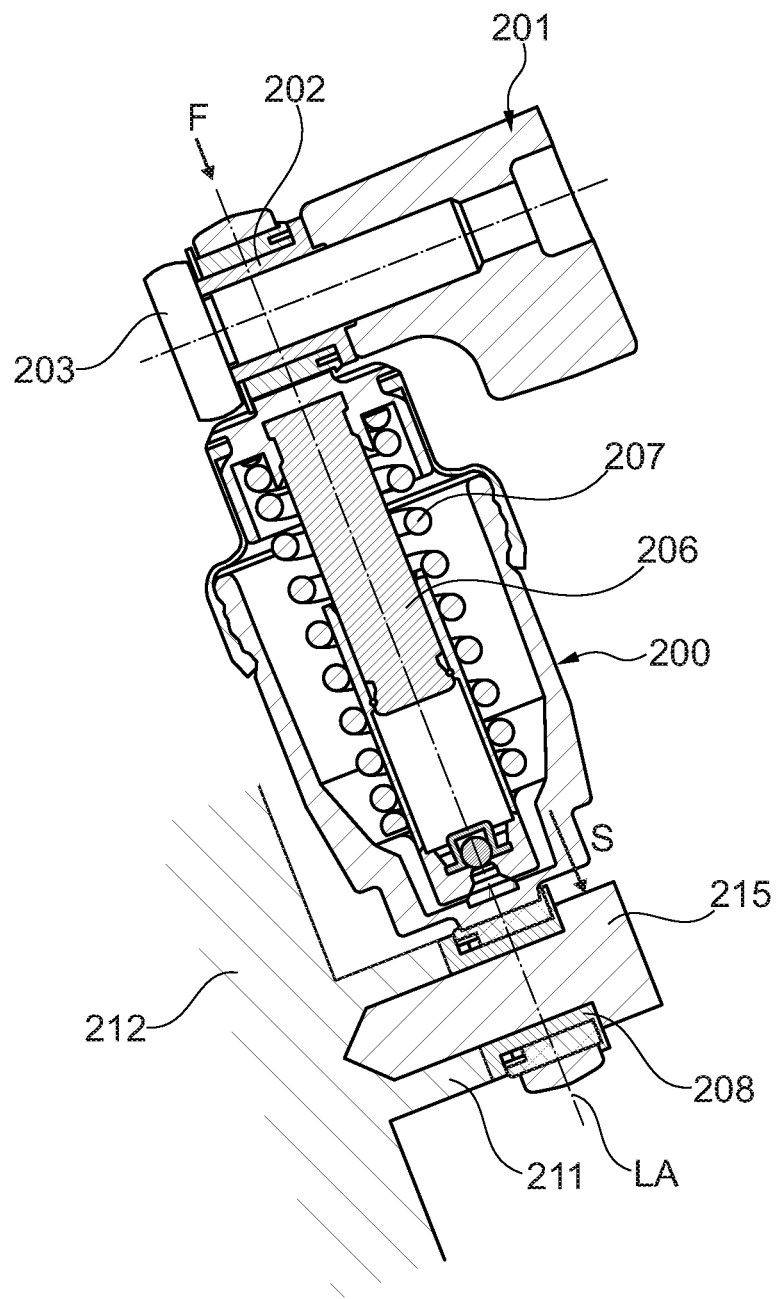
FIG. 13 is a cross sectional view of a prior art hydraulic strut sub-assembly with surrounding structure.

FIG. 10 is a cross sectional view of belt tensioner assembly 1' according to a second example embodiment. FIG. 11 is a front view of belt tensioner assembly 1'. FIG. 12 is a side view of belt tensioner assembly 1'. The following description should be viewed in light of FIGS. 10-12. Belt tensioner 1' includes; lever arm 2 having a pulley end 2A, strut end 2B, travel stop 3 and a pivot point 2C between pulley end 2A and strut end 2B; pulley 4 rotatably mounted to lever arm 2 at pulley end 2A; and hydraulic strut sub-assembly 10 rotatably mounted to lever arm 2 at strut end 2B. Strut sub-assembly includes; first fixing eye 11' rotatably assembled to lever arm 2 at strut end 2B, for example, using fastener 12; outer housing 15 having an inner hydraulic cavity 16, top portion 17 and bottom portion 18; coil spring 20 within cavity 16, extending from top portion 17 to bottom portion 18 of housing 15; hydraulic piston 25 nested within coil spring 20 for hydraulically damping lever arm 2; second fixing eye 30 rotatably mounted on mounting collar 100; mounting collar 100 having first longitudinal end 31 extending toward lever arm 2 and second longitudinal end 32 including cupped portion 35 arranged to seat on mounting boss 40 of engine 41 (not shown); bar or travel limiter 50' rotatably mounted on first longitudinal end 31 of mounting collar 100 at a first mounting portion 101, and extending axially with respect to axis HA of hydraulic strut 60 in a first direction away from lever arm 2 toward a second mounting portion 102, and in a second direction towards stop 3 of lever arm 2, for limiting travel of arm 2 relative to mounting collar 100. A stiffening member or portion 103 extends axially between first mounting portion 101 and second mounting portion 102, providing additional support or rigidity to bar 50', transferring force to a second fastener 52. Bar or travel limiter 50, mounting collar 100 and second fixing eye 30 is mounted at first mounting portion 101 on first longitudinal end 31 of mounting collar 100 using fastener 51 and at second mounting portion 102 on second engine boss 42 using fastener 52.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A belt tensioner, comprising:
   a lever arm having a pulley end, a strut end, a stop adjacent the strut end and a pivot point between the pulley end and the strut end;
   a pulley rotatably mounted at the pulley end on the lever arm;
   a hydraulic strut sub-assembly including:
      a first fixing eye rotatably assembled to the lever arm at the strut end;
      an outer housing having an inner hydraulic cavity and a top and a bottom portion;
      a coil spring within the inner hydraulic cavity, extending from the top to the bottom portion of the housing;
      a hydraulic piston radially aligned with the coil spring;
      a second fixing eye rotatably mounted on a mounting collar having a first longitudinal end extending toward the lever arm and a second longitudinal end including a cupped portion arranged to seat on a mounting boss of an engine; and
      a bar mounted at a first mounting portion on the first longitudinal end of the mounting collar, and extending axially with respect to the hydraulic strut towards the stop of the lever arm, for limiting travel of the arm relative to the second fixing eye.

2. The belt tensioner of claim 1, further comprising a stiffening portion extending axially from the bar, axially opposite from the stop of the lever arm, having a second mounting portion arranged to fixedly connect the stiffening portion to an engine.

3. The belt tensioner of claim 2, wherein the bar and the stiffening portion are one continuous piece.

4. The belt tensioner of claim 1, wherein in a first position the lever arm is in an untensioned phase, there is a gap between the lever arm stop and bar, and in a second position the lever arm is in a tensioned phase, the lever arm stop and bar are in contact.

5. The belt tensioner of claim 4, wherein in the second position, an external force applied to the lever arm is transferred to and supported by the bar, mounting collar and cupped portion.

6. A hydraulic strut assembly for a belt tensioner, comprising:
   a first fixing eye adapted to rotatably assemble to a lever arm of a belt tensioner;
   an outer housing having an inner hydraulic cavity and a top and a bottom portion;
   a coil spring within the inner hydraulic cavity, extending from the top to the bottom portion of the housing;
   a hydraulic piston radially aligned with the coil spring;
   a second fixing eye rotatably mounted on a mounting collar having a first longitudinal end and a second longitudinal end including a cupped portion arranged to seat on a mounting boss of an engine; and
   a bar mounted at a first mounting portion on the first longitudinal end of the mounting collar, extending axially with respect to the hydraulic strut.

7. The hydraulic strut assembly of claim 6, further comprising a stiffening portion extending axially from the bar having a second mounting portion arranged to fixedly connect the stiffening portion to an engine.

8. The hydraulic strut assembly of claim 7, wherein the bar and the stiffening portion are one continuous piece.

\* \* \* \* \*